2,885,405

LOWER-ALKYL CYCLOPENTYLMETHYL, BENZOTHIAZOLYL SULFENAMIDES

John J. D'Amico, Nitro, W. Va., assignor to Monsanto Chemical Company, St. Louis, Mo., a corporation of Delaware No Drawing. Application December 10, 1956
Serial No. 627,104

9 Claims. (Cl. 260—306.6)

The present invention relates to a new class of benzothiazole sulfenamides which are characterized as accelerators of the vulcanization of rubber possessing good scorch resisting properties. Many good rubber vulcanizing accelerators unfortunately are so active as to develop to varying extents some vulcanization of the rubber compound during preliminary mixing and handling steps where the rubber stock is subjected to temperatures somewhat below normal vulcanizing temperatures Such conditions are commonly known as scorching tendency and such action results in the development of a finished product of somewhat inferior quality or, if the scorching is severe, may result in ruining the rubber stock. Consequently, the availability of accelerators, speedy in action in the cure but with retarding action during the handling steps, is much to be desired.

The products of the present invention are characterized by possessing the general formula R—N—R$_1$ where R represents a benzothiazole group which may be substituted and R$_1$ represents a cyclopentylmethylamine nucleus. The benzothiazole group includes 2-mercaptobenzothiazole and its ring substituted analogues such as alkyl, chlor, alkoxy, nitro and phenyl substituents thereof and their alkali salts, and the amine reacted therewith by the process set forth hereinafter includes the methyl, ethyl, propyl, isopropyl and butyl derivatives, all classified as cyclopentylmethylamines. Examples of the new compounds, all of which are excellent accelerators of the vulcanization of natural or synthetic sulfur vulcanizable hydrocarbon rubbers, comprise N-(2,3,3-trimethylcyclopentylmethyl)-2-benzothiazolesulfenamide, N-(2,2,3-trimethylcyclopentylmethyl)-2-benzothiazolesulfenamide, N-(1,4,5,5-tetramethylcyclopentylmethyl)-2-benzothiazolesulfenamide, N-(1,3-dimethylcyclopentylmethyl)-2-methylbenzothiazolesulfenamide, and N-(1-methyl-3-isopropylcyclopentylmethyl)-2-benzothiazolesulfenamide. These new compounds may be prepared by the oxidative condensation of the cyclopentylamine and mercaptobenzothiazole. The following typical examples illustrate suitable techniques.

EXAMPLE 1.—PRODUCT A

*N-(1,3-dimethylcyclopentylmethyl)-2-benzothiazolesulfenamide*

A solution was prepared by dissolving 43 parts (0.25 mole) of 97% mercaptobenzothiazole in 100 parts of water containing 40 parts (0.25 mole) of 25% sodium hydroxide solution. The solution was filtered to remove traces of insoluble particles, and to this, while agitating, there was slowly added 32 parts (0.375 mole) of 1,3-dimethylcyclopentanemethylamine. After stirring for a few minutes after the amine had all been added, 50 parts of 25% sulfuric acid solution were added very slowly with continuous agitation, whereupon 22.32 parts of sodium hypochlorite (0.3 mole) in the form of a water solution thereof, were slowly added while holding the temperature of the mass between 25–30° C. After all the hypochlorite had been introduced, agitation of the mass was continued for about an hour and then a small portion (about 2 parts) of sodium sulfite was added, while agitating to destroy any unreacted oxidizing agent present. The entire mass was then cooled to below 25° C. and extracted with ether. After filtering to remove any disulfides present as ether insoluble material, the ether extract was repeatedly washed with water until the washings reacted neutral to litmus. The ether extract was then dried of moisture by means of anhydrous sodium sulfate and the ether removed in vacuo at a maximum temperature of 30° C. The product remaining was a viscous oil, amber in color, and was soluble in ether, acetone, benzene, chloroform, ethanol and ethyl acetate and was insoluble in heptane and water. It was obtained in 87.6% yield. The compound named at the commencement of this example possesses the empirical formula $C_{15}H_{20}N_2S_2$, which was identified as the product formed by analysis, as evidenced by the results:

|  | Percent Theory | Percent Found |
|---|---|---|
| Nitrogen | 9.58 | 9.30 |

EXAMPLE 2.—PRODUCT B

*5-chloro-N-(1,3-dimethylcyclopentylmethyl)-2-benzothiazolesulfenamide*

The product named above was obtained by following the procedure as detailed in Example 1, but substituting 50.4 parts (0.25 mole) of 5-chloro mercaptobenzothiazole and 52 parts (0.41 mole) of the same cycloalkylamine employed in the example. The product, obtained in 85% yield, possessed the same solubility characteristics as did the product of the first example and was a tan colored solid melting at 73–75° C. and was identified as the product shown above, of empirical formula $C_{15}H_{19}ClN_2S_2$ by analysis which gave as results:

|  | Percent Theory | Percent Found |
|---|---|---|
| Nitrogen | 8.57 | 8.74 |
| Chlorine | 10.85 | 11.16 |

EXAMPLE 3.—PRODUCT C

*6-ethoxy-N-(1,3-dimethylcyclopentylmethyl)-2-benzothiazolesulfenamide*

As another example of the invention, a slurry was prepared of 52.8 parts (0.25) mole of 6-ethoxy mercaptobenzothiazole in 25 parts of water containing 40 parts (0.25 mole) of 25% sodium hydroxide solution. While agitated there was slowly added thereto 63.6 parts (0.5 mole) of 1,3-dimethylcyclopentanemethylamine. After complete agitation, and with continuous stirring, there was then slowly added 50 parts of 25% sulfuric acid. Thereupon there was slowly added 22.4 parts (0.3 mole) of sodium hypochlorite in the form of a solution (138 ml. of a 16.1% solution). During the addition of the hypochlorite and for approximately a period of an hour thereafter, the temperature of the mix was maintained between 45–50° C. After this there was added to the stirred mixture about 4 parts of sodium sulfite to destroy any excess of hypochlorite present. After cooling to 25° C. or less, the reaction mixture was extracted with ether and the mixture filtered to remove traces of disulfide present. Thereupon the ether solution was repeatedly washed with water until the washings were neutral to litmus, the solution was then dried of water droplets by means of anhydrous sodium sulfate and the ether was then removed in vacuo. A viscous oil, amber in color, was obtained in 81.2% yield as the desired reaction product. This product exhibited the same solubility characteristics as did the products of Examples 1 and 2. Identity of the product (empirical formula $C_{17}H_{24}N_2OS_2$) was proved by analysis as shown by the results:

|   | Percent Theory | Percent Found |
|---|---|---|
| Nitrogen | 8.33 | 8.00 |

As an example of the accelerating activity of the products now claimed, tests were carried out on stocks prepared in the usual manner from the following recipes, all in parts by weight:

|   | Stock A, Parts by weight | Stock B, Parts by weight |
|---|---|---|
| Smoked sheets rubber | 100 | 100 |
| Carbon black (Philblack O) | 50 | 50 |
| Zinc oxide | 5 | 5 |
| Stearic acid | 3 | 3 |
| Saturated hydrocarbon softener | 3 | 3 |
| Sulfur | 2.5 | 2.5 |
| Antioxidant | 1.5 | 1.5 |
| Product A | 0.5 |  |
| Product B |  | 0.5 |

The stocks so compounded were cured in the usual manner by heating in a press for various periods of time at a temperature of 144° C. The modulus and tensile properties of the resulting products are set forth below:

TABLE I

| Stock | Cure Time in Mins. | Modulus of Elasticity in lbs./in.² at Elongation of 300% | Tensile at Break in lbs./in.² |
|---|---|---|---|
| A | 30 | 2,210 | 3,770 |
|   | 45 | 2,560 | 3,840 |
|   | 60 | 2,500 | 3,820 |
| B | 30 | 2,220 | 4,010 |
|   | 45 | 2,380 | 3,630 |
|   | 60 | 2,300 | 3,860 |

The scorch delay of the uncured compositions was evaluated by means of a Mooney plastometer. The time required for incipient vulcanization or scorch was taken at the point on the plasticity curve when the plasticity began to rise continuously:

TABLE II

| Stock | Mooney Scorch in Mins. at 135° C. |
|---|---|
| A | 23.2 |
| B | 23.5 |

It is intended to cover all changes and modifications of the examples of the invention herein chosen for purposes of disclosure which do not constitute departures from the spirit and scope of the invention.

What is claimed is:

1. As a new product a sulfenamide of the structure $$R-S-\overset{H}{N}-R_1$$

where R is a radical selected from the group consisting of benzothiazolyl and lower alkoxy, lower alkyl, phenyl and chloro substitution products thereof and $R_1$ is a hydrocarbon radical having the carbon linked to nitrogen further linked to lower alkyl substituted cyclopentyl, residual valances on the aforesaid carbon being satisfied by a member of the group consisting of hydrogen and lower alkyl radicals.

2. As a new product a sulfenamide of the structure $$R-S-\overset{H}{N}-CH_2-R_1$$

where R represents a benzothiazolyl radical and $R_1$ represents an alkyl cyclopentyl radical containing at least one but not more than four lower alkyl substituents.

3. As a new product a sulfenamide of the structure $$R-S-\overset{H}{N}-R_1$$

wherein R represents a benzothiazolyl radical and $R_1$ represents a di(lower alkyl) cyclopentylmethyl radical.

4. As a new product a sulfenamide of the structure $$R-S-\overset{H}{N}-R_1$$

wherein R represents a benzothiazolyl radical and $R_1$ represents a dimethylcyclopentylmethyl radical.

5. As a new product a sulfenamide of the structure $$R-S-\overset{H}{N}-R_1$$

wherein R represents a chlor substituted benzothiazolyl radical and $R_1$ represents a dimethylcyclopentylmethyl radical.

6. As a new product a sulfenamide of the structure $$R-S-\overset{H}{N}-R_1$$

wherein R represents a lower alkoxy substituted benzothiazolyl radical and $R_1$ represents a dimethylcyclopentylmethyl radical.

7. The product N-(1,3-dimethylcyclopentylmethyl)-2-benzothiazolesulfenamide.

8. The product 5-chloro-N-(1,3-dimethylcyclopentylmethyl)-2-benzothiazolesulfenamide.

9. The product 6-ethoxy-N-(1,3-dimethylcyclopentylmethyl)-2-benzothiazolesulfenamide.

References Cited in the file of this patent

UNITED STATES PATENTS

| 2,129,621 | Lichty | Sept. 6, 1938 |
| 2,191,657 | Harman | Feb. 27, 1940 |
| 2,354,427 | Carr | July 25, 1944 |
| 2,382,793 | Howland | Aug. 14, 1945 |